No. 838,393. PATENTED DEC. 11, 1906.
C. A. ECK.
GOVERNING DEVICE FOR DYNAMOS.
APPLICATION FILED JUNE 16, 1905. RENEWED MAY 29, 1906.

Witnesses:
Chas. D. King.
Anna Wissemann.

Inventor.
Chas. A. Eck
by Beeken & Spaulding
Attys.

UNITED STATES PATENT OFFICE.

CHARLES A. ECK, OF NEWARK, NEW JERSEY.

GOVERNING DEVICE FOR DYNAMOS.

No. 838,393.      Specification of Letters Patent.      Patented Dec. 11, 1906.

Original application filed August 12, 1903, Serial No. 169,172. Divided and this application filed June 16, 1905. Renewed May 29, 1906. Serial No. 319,359.

*To all whom it may concern:*

Be it known that I, CHARLES A. ECK, a citizen of the United States of America, and a resident of Newark, county of Essex, and State of New Jersey, have invented certain new and useful Improvements in Governing Devices for Dynamos, of which the following is a specification.

The present invention relates generally to dynamos, and has more particular reference to a governor adapted to respond to fluctuations in the voltage of the said dynamo.

The invention contemplates a governor whose action depends upon the fluctuations in the voltage of the dynamo, so that when the voltage increases above a certain point the governor will act to lessen the speed of the said dynamo, and when the voltage decreases below a certain point the governor will act to increase the speed again. The voltage and the speed of the dynamo thus reciprocate and tend to render both the voltage and speed constant.

In carrying out the invention the dynamo is provided with a magnetic field and with a rotatable shaft carrying an armature and a commutator mounted within the said field so as to be capable of a longitudinal movement. The dynamo will be suitably driven by any means found useful for the purpose, but is in the present instance shown as receiving its motion from the fly-wheel of an internal-combustion motor through the instrumentality of a friction-pulley moving with the armature-shaft. The dynamo is pivoted transversely to its longitudinal axis, and a member pivoted at a fixed point and connected with the dynamo is adapted to bear against the end of the armature-shaft under tension so as to normally move the said shaft out of its central longitudinal position, thereby turning the dynamo around its pivot in one direction and causing the friction-pulley to engage with the driving-wheel, while the action of the field when the voltage increases above a certain point will tend to draw the armature-shaft into its central longitudinal position and acting through the member bearing against its end will cause the dynamo to turn around its pivot in the other direction, thereby moving the friction-pulley out of engagement with the driving-wheel.

The present application is a division of one filed on the 12th of August, 1903, Serial No. 169,172.

Figure 1:
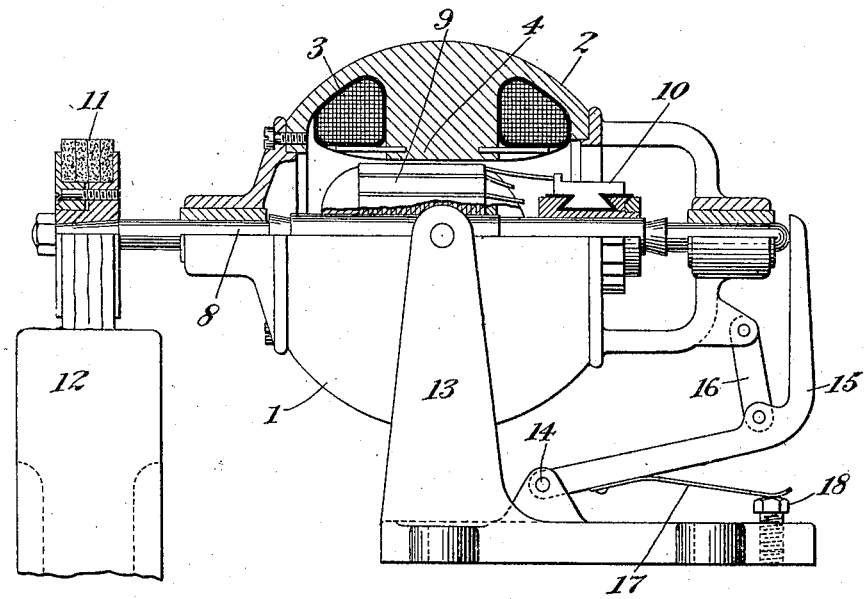
Figure 2:
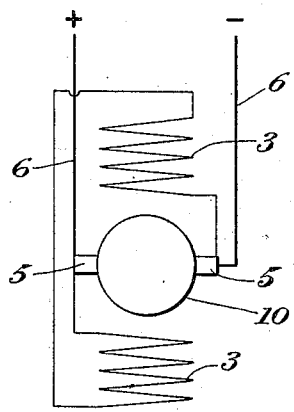

In the drawings, Figure 1 represents a side elevation, partly in section and broken away, so as to facilitate the illustration of the invention, of a dynamo embodying the invention. Fig. 2 shows the circuit of the said dynamo.

Similar numerals of reference indicate corresponding parts in the different views.

1 indicates a dynamo provided with a self-exciting magnetic field comprising the casing 2, the field-coils 3, and the pole-pieces 4. As shown in Fig. 2, this dynamo is shunt-wound, the field-coils connecting with the brushes 5, to which also are attached the line-wires 6. Mounted within the said field is the rotatable armature-shaft 8, carrying the armature 9 and the commutator 10. This armature-shaft is so mounted as to be capable of a longitudinal movement within the said field. Carried by the said armature-shaft is the friction-pulley 11, adapted to engage with the driving-wheel 12 or other means.

The dynamo is pivoted on the uprights 13, only one of which is seen, transversely to its longitudinal axis. Pivoted on the fixed center 14 is a member 15, connected to the dynamo by means of the link 16 or by any other suitable means and bearing under tension against the end of the armature-shaft. A spring 17 or any other means may be used to supply the proper tension and normally tends to keep the member 15 up against the end of the armature-shaft, thereby maintaining the dynamo in its horizontal position, as shown in Fig. 1, and the friction-pulley in engagement with the driving-wheel. When the voltage increases, however, the action of the field of the dynamo will tend to center the armature-shaft, thereby causing its rear end to act against the member 15, moving the latter down, and thereby in turn tilting the dynamo around its pivots and lifting the friction-pulley out of engagement with the driving-wheel. A decrease in the voltage will enable the spring 17 to act through the member 15 to turn the dynamo back again into its horizontal position with the friction-pulley in contact with the driving-wheel.

By adjusting the screw 18 the tension of the spring may be varied, so that the device can be adjusted to act at different voltages.

What is claimed is—

1. The combination with a driving-wheel, and a dynamo pivotally supported adjacent thereto, comprising field-magnets, a friction-pulley adapted to engage with said driving-wheel, and a rotatable armature-shaft, carrying said pulley and also an armature and a commutator, mounted to move longitudinally, of means for normally keeping the armature-shaft out of its central longitudinal position, and the friction-pulley in contact with the driving-wheel, the action of the field-magnets, when the voltage increases above a certain point, tending to move the said armature-shaft into its central longitudinal position, thereby tilting the dynamo and moving the friction-pulley out of engagement with the driving-wheel.

2. The combination with a driving-wheel, and a dynamo pivotally supported, comprising field-magnets, a friction-pulley adapted to engage with said driving-wheel, and a rotatable armature-shaft, carrying said pulley and also an armature and a commutator, mounted to move longitudinally, and adapted to be moved into its central longitudinal position by the action of the field-magnets when the voltage increases above a certain point, thereby tilting the dynamo, and moving the friction-pulley out of contact with the driving-wheel, of means for automatically moving the said shaft out of its central longitudinal position when the voltage drops below a certain point, thereby moving the dynamo back and the friction-pulley into contact with the driving-wheel, thus increasing the speed of the armature-shaft.

3. The combination with a driving-wheel, and a dynamo pivotally supported, comprising field-magnets, a friction-pulley adapted to engage with said driving-wheel, and a rotatable armature-shaft, carrying said pulley, and also an armature and a commutator, mounted to move longitudinally, of a member pivoted on a fixed center and connected to the dynamo, adapted to bear against the end of the armature-shaft under tension, so as to move the said shaft out of its central longitudinal position when the voltage decreases below a certain point, thereby turning the dynamo around its pivot, and moving the friction-pulley into engagement with the driving-wheel, the action of the field-magnets, when the voltage rises above a certain point, tending to move the said shaft into its central longitudinal position so as to act upon the member bearing against its end, thereby causing the dynamo to turn around its pivot, and the friction-pulley to be moved out of engagement with the driving-wheel.

4. The combination with a driving-wheel, and a dynamo pivoted transversely to its longitudinal axis, comprising field-magnets, an armature-shaft carrying an armature and a commutator, and a friction-pulley for operating the armature-shaft of the dynamo adapted to engage with said driving-wheel, of means for turning the dynamo around its pivot in one direction when the voltage decreases below a certain point thereby moving the friction-pulley into contact with the driving-wheel, the action of the field-magnets, when the voltage increases above a certain point, causing the dynamo to swing around its pivot in the other direction, thereby moving the friction-pulley out of contact with the driving-wheel.

Signed at Belleville, New Jersey, this 15th day of June, 1905.

CHARLES A. ECK.

Witnesses:
KARL G. GILLBERG,
AXEL V. BEEKEN.